United States Patent Office.

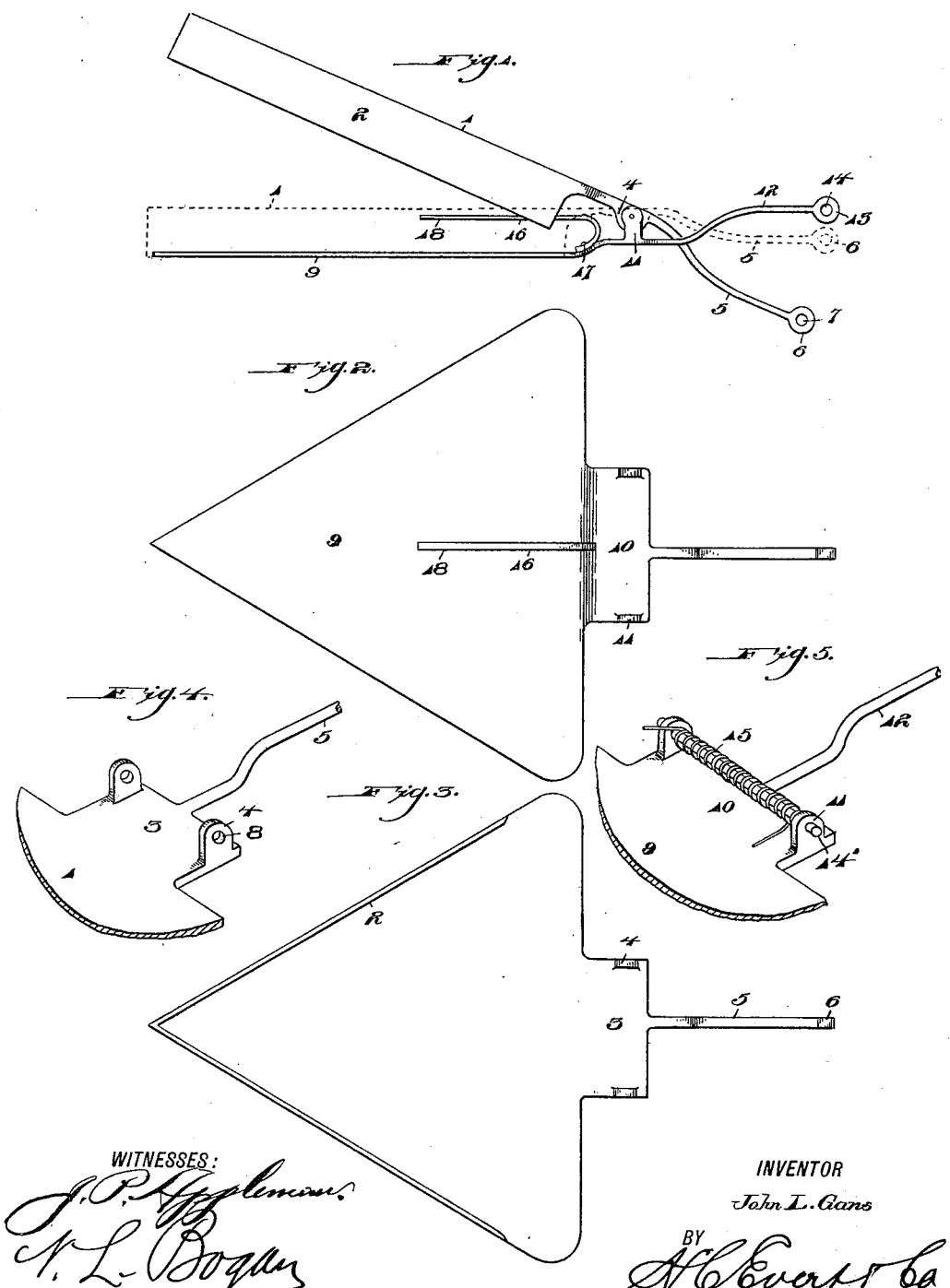

JOHN L. GANS, OF CONNELLSVILLE, PENNSYLVANIA.

PIE OR CAKE CUTTER.

SPECIFICATION forming part of Letters Patent No. 634,330, dated October 3, 1899.

Application filed December 10, 1898. Serial No. 698,869. (No model.)

*To all whom it may concern:*

Be it known that I, JOHN L. GANS, a citizen of the United States of America, residing at Connellsville, in the county of Fayette and State of Pennsylvania, have invented certain new and useful Improvements in Pie or Cake Cutters, of which the following is a specification, reference being had therein to the accompanying drawings.
My invention relates to certain new and useful improvements in pie and cake cutters.

The object of my invention is to provide a device of this character for slicing or cutting pie or cake and serving the same without using a knife.

A further object of my invention is to construct a device of this character which will prevent the bottom crust of the pie from breaking during the cutting operation and also prevent the fingers from coming into contact with the pie when serving the same.

A further object of my invention is to construct a device of this character which will uniformly slice or cut the pie or cake.
A further object of my invention is to construct a pie or cake cutter of this character with means to remove the pie or cake from the plate on its upward movement after the cutting operation.
My invention finally consists in the novel combination and arrangement of parts hereinafter more fully described, and particularly pointed out in the claims.

In describing the invention in detail reference is had to the accompanying drawings, forming a part of this specification, wherein like numerals of reference indicate corresponding parts throughout the several views thereof, and in which—
Figure 1 is a side view of my improved device. Fig. 2 is a top plan view of the bottom plate. Fig. 3 is an inverted plan view of the top plate. Fig. 4 is an inverted perspective view of the supporting-bracket, a portion of the top plate, and a portion of the handle therefor. Fig. 5 is a perspective view of the extension formed integral with the bottom plate, showing the brackets having the shaft and spring mounted thereon, to which the top plate is adapted to be secured.

Referring to the drawings by reference-numerals, 1 indicates the top plate, which is substantially triangular in shape and has formed on the underneath face thereof on each edge the cutting blades or knives 2. This top plate is provided with oblong extensions 3, which are formed integral therewith.

4 indicates a pair of brackets, which are formed integral with the underneath face of the extension 3, and 5 the handle for the top plate. The handle 5 is bent downwardly, as shown, and has its free end enlarged, as at 6, having the aperture 7 arranged therein. The brackets 4 are also apertured, as at 8.

9 indicates a bottom plate, which is used as a server and is substantially triangular in shape, having formed integral therewith the oblong extension 10, provided on its upper face with the upwardly-extending brackets 11, which are apertured in the same manner as the brackets 4. The bottom plate 9 is provided with a handle 12, which is bent upwardly, as shown, and has the outer end thereof enlarged, as at 13, provided with an aperture 14 therein.

The top plate is secured to the bottom plate by means of the pin or shaft 14', operating through the apertures formed in the brackets arranged on the oblong extensions, as shown in Fig. 1 of the drawings.

15 indicates a spiral spring, which is mounted on the shaft 14', with both its ends extending forwardly, one engaging the upper face of the extension 10 and the other engaging the underneath face of the extension 3. The tension of this spring serves to hold the top plate in the normally-elevated position shown in Fig. 1.

16 indicates a tongue, which is secured to the bottom plate, as at 17, and is bent inwardly, as at 18. This tongue 16 is adapted to remove the pie or cake from the top plate on the upward movement thereof. The bent portion 18 of the tongue 16 is bent at such a height as to allow the pie or cake to pass under the same before the cutting operation.

The top plate and the bottom plate are secured in the position shown in dotted lines when not in use by the insertion of a fastening-pin into the apertures 6 14 of the handles 5 12.

The operation of my improved pie and cake cutter is as follows: The bottom plate, with the top plate in an elevated position, is inserted underneath the pie or cake, and by elevating the handle 5 of the top plate it will move the cutting blades or knives 2 against the pie or cake, and the action of the spring 10 will release the same immediately after the cutting operation. At the same time on the upward movement of the top plate the tongue 16 will dislodge the slice of pie or cake from between the cutting-blades, if it sticks thereto. After the cutting operation the slice of pie or cake can be carried on the bottom plate and served to the person desired without the fingers coming in contact therewith.

My improved pie and cake cutter may be constructed of any desired metal, ornamented, if so desired, and the metal may be plated with silver or any other alloy.

It will be noted that various changes may be made in the details of construction without departing from the general spirit of my invention.

Having thus fully described my invention, what I claim as new, and desire to secure by Letters Patent, is—

1. In a device of the character described, the combination of a bottom and a top plate pivotally secured together, said top plate having cutting knives or blades formed on two of its edges, substantially as described.

2. In a device of the character described a triangular-shaped bottom plate, an extension formed integral therewith, a top plate secured to said extension, and cutting blades or knives carried by said top plate, and means for normally keeping the said top plate in an elevated position, substantially as shown and described.

3. In a device of the character described a triangular-shaped bottom plate, an extension formed integral therewith, a handle secured thereto, brackets carried by said extension, a shaft mounted therein, a top plate mounted on said shaft, and a handle carried by said top plate, substantially as shown and described.

4. In a device of the character described a bottom plate, an extension formed integral therewith, a shaft mounted on said extension, a top plate mounted on said shaft, a handle formed integral therewith, and means carried by said shaft for keeping the top plate in an elevated position, substantially as shown and described.

5. In a pie and cake cutter a triangular-shaped bottom plate, an extension formed integral therewith, a handle secured to said extension, brackets carried by the said extension, a shaft mounted therein, a spring carried by said shaft, a top plate mounted on said shaft, and a handle formed integral with said top plate, substantially as shown and described.

6. In a pie and cake cutter a bottom plate, an extension formed integral with said plate, a top plate suitably connected to said extension, and means carried by said bottom plate to free the slice of pie or cake from the top plate after the cutting operation, substantially as shown and described.

7. In a device of the character described, the combination of a bottom and a top plate pivotally secured together, said top plate having cutting knives or blades formed on two of its edges, and means connected to the bottom plate and engaging the top plate for holding the latter in a normally-elevated position.

8. In a device of the character described, the combination of a bottom and a top plate pivotally secured together, said top plate having cutting knives or blades formed in one or more of its edges, and a spring connected to said bottom plate with one of its ends engaging the underneath face of the top plate for holding the latter in a normally-elevated position.

In testimony whereof I affix my signature in the presence of two witnesses.

JOHN L. GANS.

Witnesses:
JOHN KURTZ,
SAML. KURTZ.